Feb. 26, 1957  H. D. REY  2,782,825
DEVICE FOR REMOVING THE MEAT FROM COCONUTS
Filed Jan. 29, 1954
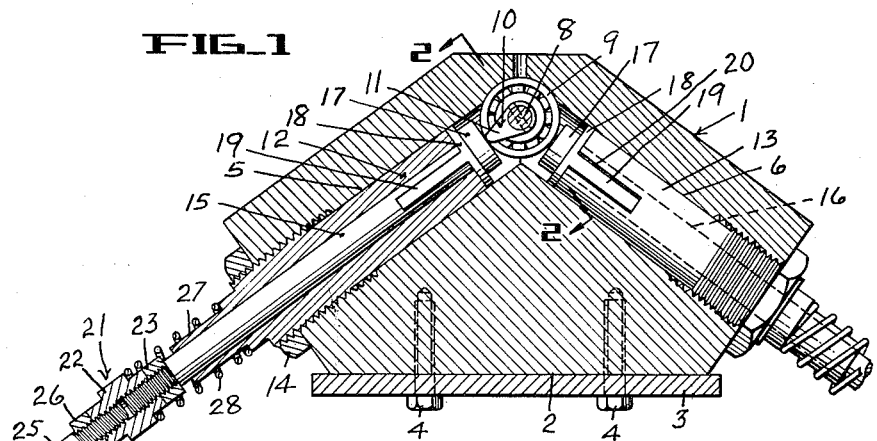
FIG_1
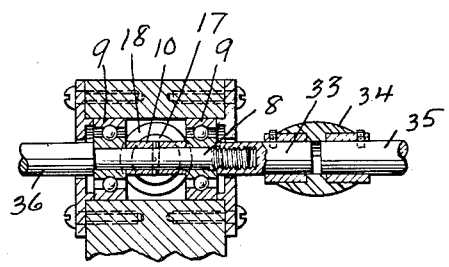
FIG_2
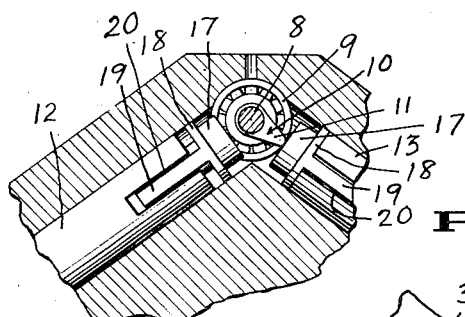
FIG_4
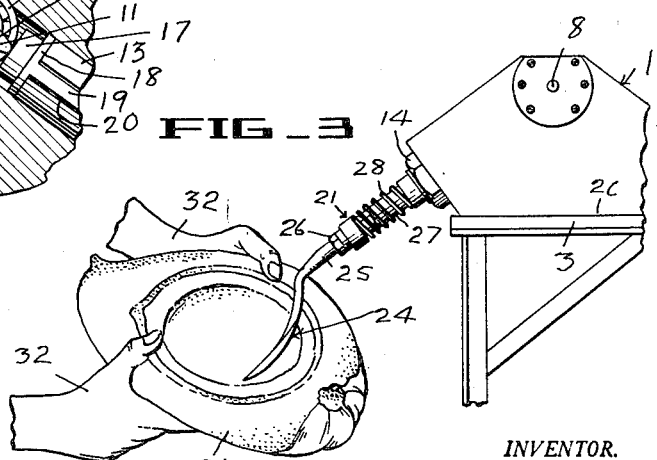
FIG_3
INVENTOR.
HENRI DANIEL REY
BY
Boykin, Mohler & Beckley
ATTORNEYS United States Patent Office 2,782,825
Patented Feb. 26, 1957

2,782,825
DEVICE FOR REMOVING THE MEAT FROM COCONUTS

Henri Daniel Rey, Papeete, Tahiti

Application January 29, 1954, Serial No. 407,067

6 Claims. (Cl. 146—7)

This invention relates to a device for removing meat from coconuts and for similar purposes, and has for one of its objects the provision of a safe, efficient, economical and rugged device for cutting the meat from coconuts.

The invention will hereinafter be referred to in connection with coconuts only, with the understanding that it is not to be necessarily restricted to coconuts.

Heretofore hand knives have been used for cutting the kernel or meat from coconuts. The coconuts are split in half and skilled workmen then cut the meat from the shell by holding a half in one hand and manipulating the knife with the other hand. This is slow and extremely tiring work and in order to remove the meat it is usually necessary to cut the meat in the shell into small pieces. When it is considered that the worker is required to exert a force of anywhere from 15 to 40 lbs. on the knife to cut the kernel or meat, depending upon the thickness of the latter, it is obvious why the work is very tiring, and this is one of the reasons why there are frequent injuries.

By the method heretofore used, the worker holds the coconut half by one hand, and operates the knife with the other hand, as above noted. Either the coconut or the knife may accidentally slip, resulting in an accident, and in any event, the daily output of a highly skilled workman is in the hundreds.

By the present invention the workman does not manually manipulate the knife, but instead, he merely handles the coconut half. The knife is reciprocable, but only when the workman forces the meat of the coconut against the knife, and then the degree of reciprocation of the knife is entirely dependent upon the degree of pressure exerted by the worker.

By enabling the operator to use both hands to manipulated the coconut half and with the cuttingknife arranged to be automatically stationary and in operative except when performing a cutting operation, the chance of an accident happening is almost negligible, and such chance is further reduced to become virtually negligible, and at the same time to further reduce the wear on an operator, by providing a structure in which the knife and its reciprocable mounting are directed generally downwardly or at an angle of about 45° (preferably slightly less) relative to horizontal.

The above angular arrangement enables the operator to force the coconut meat against the knife by a lifting movement that transfers a considerable portion of the lifting effort to the shoulders and back of the operator, and at the same time the operator can clearly see the position of the knife and its operation during the cutting operation by looking downwardly onto the generally upwardly facing cut half of the coconut. Should the operator stumble or fall forwardly and contact the cutting knife, no injury would happen since the knife would be inoperative except when pushed upwardly, and by reason of said angular position it would automatically move to inoperative position by gravity, thereby eliminating reliance upon a spring or other mechanical means to render it inoperative.

By the present invention the average operator can efficiently and with safety, cut the meat from many thousands of coconuts per 8 hour day, with less fatigue, than an operator could formerly cut the meat from several hundred, and he is able to do a much better job.

One of the objects of the invention is the provision of a device that enables the operator to accomplish the above stated improved results.

A still further object of the invention is the provision of a device adapted to be used by two operators for cutting meat from coconuts and in which device less power is required to operate the machine than would normally be the case and there is very little noticeable vibration as compared with two single cutters.

Other objects and advantages will appear in the drawings and in the description.

In the drawings:

Fig. 1 is a vertical sectional view through a device that is illustrative of the invention, a portion of said device being removed to accommodate the view to the sheet.

Fig. 2 is a sectional view taken along line 2—2 of Fig. 1.

Fig. 3 is a reduced size side elevational view of the device of Fig. 1 (partly broken away to accommodate the view to the sheet) and showing the knife in a position cutting meat from a coconut half.

Fig. 4 is a fragmentary sectional view of a portion of the device of Fig. 1, showing the upper ends of the tool holders when two knives are being operated for cutting coconuts.

In detail, the invention, as illustrated in the drawings, comprises a body 1 that has a flat, horizontal base 2 for supporting said device on a firm support 3. Screws or bolts 4 rigidly secure said body to said support.

Body 1 is formed with a pair of downwardly divergently extending cylindrical bores 5, 6 that open into each other at their upper ends.

A horizontal shaft 8 is supported by horizontally spaced ball bearings 9 in the upper end of said body, for rotation of said shaft about an axis extending through the point of intersection of the axes of bores 5, 6. The outer races of said bearings 9 are secured in a bore formed in body 1 at right angles to bores 5, 6.

A rotary hammer 10 is rigidly secured or keyed to shaft 8 in a position between bearings 9, so as to position said hammer directly over the upper ends of bores 5, 6.

The hammer 10, as seen in the drawing, is substantially in the form of a cam having a high side 11 and a low side opposite thereto. It may have several high sides if desired, but inasmuch as the shaft 8 is power driven at a speed of around 2000 revolutions per minute, a single high side is usually adequate.

Secured in bore 5 is an elongated slide bearing 12 and a corresponding slide bearing 13 is in bore 6. Bearings 12, 13 are cylindrical and are externally threaded at their lower ends for threadedly engaging internal threads formed in the lower ends of bores 5, 6. The threaded lower ends of bearings 12, 13 may partially project from body 1 for securement of a lock nut 14 on the lower end of each bearing. The degree that bearings 12, 13 extends into bores 5, 6 is regulated by rotating the bearings, and once the desired position for each bearing is obtained, the lock nuts are tightened against the body 1 and the bearing will stay fixed.

Tool holders 15, 16 respectively extend through the bearings 12, 13 for longitudinal reciprocation of said holders in said bearings. Each tool holder is in the form of a rod slidably supported in each bearing 12, 13, and each rod has an enlarged head 17 at its upper end. Heads 17 on holders 15, 16 are adapted to freely reciprocate between ball bearings 8, 9 to the limit permitted by the hammer 10, and said heads are engaged by said hammer and are caused to reciprocate, with resultant reciprocation of holders 15, 16, as long as there is an upward force applied to the holders to hold said heads against the hammer.

A radially outwardly projecting flange 18 is on each holder 15, 16 at the juncture between each head 17 and the holder, which flange is adapted to seat against the upper end of each bearing 12, 13 to limit the downward movement of each holder. Of course the head 17 on each holder could perform this function, hence, for all practical purposes the head and flange could be considered as being the same.

Below each flange 18 on each holder are a pair of ribs 19 that are at opposite sides of the upper end of each holder 12, 13. These ribs are slidably retained in slots 20 that are formed in opposite sides of the upper ends of bearings 12, 13. Thus it is seen that while the holders 15, 16 may reciprocate in bearings 12, 13, they cannot rotate therein.

At the lower end of each holder 15, 16 is a chuck, generally designated 21, for securing a cutting tool thereto. Each chuck consists of a sleeve 22 that is internally threaded for screwing onto the externally threaded lower end of each holder 15, 16. A lock nut 23, also on the threaded lower end of each holder function as a lock nut for securing each sleeve 22 against rotation.

A cutting tool, generally designated 24, has a threaded shank 25 that is threadedly held in sleeve 22, and which shank is secured to said sleeve against rotation relative to the latter, by means of a lock nut 26 on said shank.

Tool 24 is generally spoon shape, but flatter, and is preferably slightly offset downwardly and laterally relative to the axis of the holder that carries it. This blade has cutting edges so that an upward force or a lateral force combined with an upwardly directed force on said blade will result in cutting of the object so forced against the blade.

The angle at which the holders 15, 16 are disposed, and which is preferably about 40° relative to horizontal, is adequate to cause said holders to slide downwardly by gravity to the point where flanges 18 are in engagement with the upper ends of bearings 12, 13, and when said flanges so engage the upper ends of the bearings, the heads 17 are out of engagement with the hammer 10 during rotation of the latter.

Upward movement of the holders 15, 16 is limited by the engagement of lock nuts 23 with downward extension 27 of bearings 12, 13.

From the above construction it will be seen that the maximum upward movement of the holders can be such that the full stroke of hammer 10 can be effective for driving the holders downwardly, in which case the holders 15, 16 would have a substantial stroke, or the maximum upward movement of the holders could be such that only a very small portion of the stroke of the hammer would be transmitted to the holders, and only small movement of the latter would occur. The lock nut 14 can virtually control the stroke of the holders since the holders 15, 16 are moved toward or away from the hammer upon movement of the bearings 12, 13 in bores 5, 6.

A relatively light coil spring 28 may be positioned around the extension 27 of each bearing 12, 13 to react between a shoulder 29 on each bearing and lock nut 23 on each holder. This spring is not absolutely necessary, but is desirable where the speed of rotation of the hammer 10 is say around 2200 revolutions per minute or upward, to overcome the tendency of the holders to be sucked upwardly by the suction created by the rotation of the hammer, since an oil opening 30 is provided in body 1 communicating with the space in which the hammer 10 and bearings 9 are located. Normally the rotation of the hammer 10 is less than the degree whereby the holders tend to follow the hammers due to the speed of rotation of the hammer.

In Fig. 1 the left hand holder is shown in its downward position which could be the position to which the hammer has driven it during a cutting operation. If no upward force were applied to the holder, such as by pushing a coconut upwardly against the knife 24, the holder would stay in the position shown in Fig. 1. The right hand holder in Fig. 1 is clearly not being used, for if it were in use the head 17 of the holder would be elevated for being struck by the hammer.

In Fig. 4 the left hand holder is shown as being elevated, and this would be the position of the holder when the coconut 31 (Fig. 3) is being forced upwardly against the blade 24 by the hands 32 of an operator.

It is, of course, obvious that a single blade machine may be provided, and such a machine would merely eliminate one of the holders 15, 16 and one of the bearings 12, 13 and would also not require the portion of the body 1 that supports the bearing that is omitted. In fact, such single blade machines are used by small growers who do the splitting of the coconuts and the removing of the meat, without outside help, for in such instances only one operator does all the work.

The larger plantations all use the double bladed machine and in some instances a gang of cutters are used since shaft 8 is adapted to be coupled at both ends to other shafts.

In Fig. 2 it is seen that shaft 8 is coupled at one end to a section 33 of a flexible coupling 34 that may connect said shaft with the drive shaft 35 of an engine or motor, while a similar section 36 may be secured to the other end of shaft 8 for coupling said shaft with the shaft 8 of another cutting machine by a flexible coupling similar to coupling 34. Thus any number of devices can be driven by the same motor or engine.

By the arrangement shown in Figs. 1 and 4, the power required to operate one cutting knife is no more than is required to operate two, since the hammer 10 is effective on only one knife holder at a time.

Also, a very noticeable and desirable result of the double knife holder and the fact that the hammer operates on the holders in succession, and not simultaneously, is the reduction in the degree of vibration of the device. This is because say 4000 contacts per minute will be made by the hammer in the same time that 2000 would be made were the contacts on holders 15, 16 to be simultaneous.

The independent adjustment of the strokes of the holders is very desirable since some operators do more efficient work with a small stroke while others require a longer stroke.

Should the operator fall against the blade or knife no injury would occur for the reason that any downward force on the knives has no effect on their operation. The knives operate only when an upward force is placed on them, and if this force is relatively small, the reciprocating movement of the knife will be correspondingly small. Thus the operator can, to a degree, control the degree of reciprocation.

It may be here pointed out that the coconuts usually have the outer husks on them when split, thus providing a substantial portion for the operator to hold onto outwardly of the kernel or meat.

I claim:

1. A device for removing the meat from coconuts, comprising; a holder for a meat cutting tool, a body supporting said holder for reciprocable movement with a portion of said holder projecting from said body and movable between an outer position and an inner position upon reciprocation of said holder, with said holder projecting a greater distance from said body when in said outer position than when in said inner position, means for securing said body to a rigid support in a position supporting said holder for said reciprocable movement in a path disposed at a substantial angle relative to horizontal and vertical and with said portion projecting generally downwardly from said body, power actuated means engageable with said holder for reciprocating the latter, a meat cutting tool secured to the lower end of said holder for movement therewith, means respectively carried by said holder and by said body for supporting said holder out of engagement with said power actuated means and in said outer position, said holder being movable toward said inner position and into engagement with said power actuated means solely under the influence of pressure on said tool in a direction for moving said holder against the influence of gravity on said holder and toward said inner end in a normal meat cutting operation by said tool.

2. A device for removing the meat from coconuts, comprising; a pair of holders for meat cutting tools, a body supporting said holders with a portion of each projecting from said body and for reciprocable movement of each holder between outer position and an inner position in which said portions projecting farther from said body when in said outer positions than when in said inner positions, a power actuated element within said body intermittently and successively movable into engagement with said holders for intermittently and successively driving them to said outer positions upon said holders being moved toward their inner positions, a meat cutting tool on the projecting portion of each holder and movable means carried by said body for varying the degree of movement of each of said holders, said holders being elongated and reciprocable longitudinally thereof and at a substantial angle relative to horizontal for sliding downwardly by gravity with their projecting portions being the lowermost ends of said holders, means for holding said holders in said body when in their outer positions and said holders being out of engagement with said power actuated means when in said outer positions.

3. A device for removing the meat from coconuts comprising: a holder for a meat cutting tool, holder supporting means supporting said holder for reciprocatory movement between an outer position and an inner position, power actuatable means movable into engagement with said holder when said holder is at said inner position for driving the latter toward said outer position, means for holding said holder supporting means stationary in a position for movement of said holder in a generally downward direction from said inner position to said outer position whereby said holder will tend to move automatically under the influence of gravity to said outer position, said holder being free from resistance to so move to said outer position in the absence of cutting pressure on said holder urging the latter toward said inner position when a tool is in said holder and is in engagement with the meat of a coconut in a cutting operation, means on said holder for securing a cutting tool rigid therewith, and means respectively on said holder and said holder supporting means in cooperative engagement for holding said holder against rotation about an axis parallel with the direction of reciprocatory movement of said holder.

4. A device for removing the meat from coconuts comprising: a body, means for securing said body stationary on a support, a downwardly inclined bore within said body open at its lower end, a rotary hammer at the upper end of said bore and a power actuatable shaft rotatably supported on said body and connected with said hammer for rotating the latter about an axis extending transversely of the axis of said bore, a tool holder within said bore having an upper end adjacent to but out of engagement with said hammer upon rotation of the latter and a lower end projecting outwardly of said bore, a meat cutting tool on said lower end, said holder and said head being supported within said bore for upward movement axially of said bore to a position with said head in engagement with said hammer only upon generally upward pressure against said tool when the meat in a coconut is forced against said tool in a meat cutting operation.

5. A device for removing the meat from coconuts comprising: a body, means for securing said body stationary on a support, a bore within said body opening outwardly thereof at one end and a rotary hammer at the other end of said bore, a power actuatable shaft rotatably supported on said body and connected with said hammer for rotating the latter about an axis extending at a right angle to the axis of said bore, a tool holder within said bore, a head connected with said tool holder and disposed between said holder and said hammer and out of engagement with the latter, means within said bore supporting said tool holder and said head for movement thereof as a unit toward and away from said hammer to a position in which said head is engaged by said hammer upon rotation of the latter, said holder and said head being movable toward said hammer only under the influence of pressure against said tool holder in a direction toward said hammer, said tool holder projecting from the said one end of said bore, a tool for cutting coconut meat rigid with the projecting end of said holder and movable with the latter, and means respectively on said holder and on the means supporting the same securing said tool holder against rotation.

6. A device for removing the meat from coconuts comprising: a body, means for securing said body stationary on a support, a cylindrical bore within said body opening outwardly thereof at one end and a rotary hammer at the other end of said bore, a power actuatable shaft rotatably supported on said body and connected with said hammer for rotating the latter about an axis at a right angle to the axis of said bore, an elongated slide bearing secured within said bore and a rod supported within said bearing for reciprocable movement longitudinally thereof, means on one end of said rod between said bearing and said hammer extending over the end of said bearing adjacent thereto for supporting said rod out of engagement with said hammer and for limiting movement of said rod outwardly of said hammer, means on the end of said rod remote from said hammer and outside said body for securing a meat cutting tool thereto, said slide bearing and said bore being at a substantial incline relative to horizontal and vertical with the open end of said bore lowermost whereby said rod will tend to automatically slide at all times to a position out of engagement with said hammer when pressure against said tool in a meat cutting operation ceases.

References Cited in the file of this patent
UNITED STATES PATENTS

| | | |
|---|---|---|
| 760,878 | Kohout | May 24, 1904 |
| 1,376,346 | Locher | Apr. 26, 1921 |
| 1,464,570 | Hage | Aug. 14, 1923 |
| 2,190,105 | Mock | Feb. 13, 1940 |
| 2,276,611 | Connor | Mar. 17, 1942 |